(12) United States Patent
Nakashio

(10) Patent No.: US 10,652,431 B2
(45) Date of Patent: May 12, 2020

(54) IMAGE FORMING APPARATUS PERFORMING SPECIFIED-COLOR REMOVAL PROCESS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hidekazu Nakashio, Warabi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/257,202

(22) Filed: Jan. 25, 2019

(65) Prior Publication Data

US 2019/0238722 A1    Aug. 1, 2019

(30) Foreign Application Priority Data

Jan. 29, 2018    (JP) .................. 2018-012741

(51) Int. Cl.
*H04N 1/60* (2006.01)
*H04N 1/62* (2006.01)
*H04N 1/58* (2006.01)

(52) U.S. Cl.
CPC ......... *H04N 1/6005* (2013.01); *H04N 1/6008* (2013.01); *H04N 1/6025* (2013.01); *H04N 1/6027* (2013.01); *H04N 1/62* (2013.01); *H04N 1/58* (2013.01)

(58) Field of Classification Search
None
See application file for complete search history.

(56) References Cited

U.S. PATENT DOCUMENTS

| | | | | |
|---|---|---|---|---|
| 4,500,919 A * | 2/1985 | Schreiber | ............ | H04N 1/6005 358/518 |
| 5,113,248 A * | 5/1992 | Hibi | .................... | H04N 1/6022 358/501 |
| 5,459,590 A * | 10/1995 | Bleker | ............... | B41F 33/0036 358/518 |
| 5,473,736 A * | 12/1995 | Young | .................... | G06T 9/001 345/593 |
| 5,615,312 A * | 3/1997 | Kohler | ................. | G06K 15/02 347/43 |
| 6,009,209 A * | 12/1999 | Acker | ................. | G06K 9/0061 358/520 |
| 6,204,940 B1 * | 3/2001 | Lin | ....................... | H04N 1/407 348/E9.009 |
| 7,050,627 B2 * | 5/2006 | Cuciurean-Zapan | ....... | H04N 1/6022 358/520 |

(Continued)

FOREIGN PATENT DOCUMENTS

JP    2011188484 A    9/2011

*Primary Examiner* — Anh-Vinh T Nguyen
(74) *Attorney, Agent, or Firm* — Rossi, Kimms & McDowell LLP

(57) ABSTRACT

An image forming apparatus that is capable of improving a specified-color removal process. An obtaining unit obtains color image data. A color specification unit specifies removal color. A specified-color removal unit removes color that is determined to be removed according to determination based on a brightness threshold and a first saturation threshold about the removal color from the color image data obtained.

13 Claims, 16 Drawing Sheets

(56) References Cited

U.S. PATENT DOCUMENTS

| | | | | |
|---|---|---|---|---|
| 7,965,426 B2* | 6/2011 | Hori | H04N 1/6058 | 345/590 |
| 8,179,576 B2* | 5/2012 | Hayashi | H04N 1/6055 | 358/1.9 |
| 8,638,474 B2* | 1/2014 | Nakajima | H04N 1/6016 | 358/1.9 |
| 8,823,726 B2* | 9/2014 | Pettigrew | H04N 9/73 | 345/589 |
| 9,870,520 B1* | 1/2018 | Becker | G06K 9/6262 | |
| 2002/0176105 A1* | 11/2002 | Kawai | H04N 1/40012 | 358/1.9 |
| 2003/0098986 A1* | 5/2003 | Pop | H04N 1/54 | 358/1.9 |
| 2004/0240732 A1* | 12/2004 | Abbate | H04N 1/6077 | 382/167 |
| 2005/0052666 A1* | 3/2005 | Yamamoto | H04N 1/54 | 358/1.9 |
| 2007/0189615 A1* | 8/2007 | Liu | G06K 9/38 | 382/232 |
| 2007/0273772 A1* | 11/2007 | Shirai | H04N 9/045 | 348/223.1 |
| 2008/0016459 A1* | 1/2008 | Mann | G06F 1/3203 | 715/781 |
| 2008/0094672 A1* | 4/2008 | Kagawa | H04N 1/62 | 358/520 |
| 2008/0205751 A1* | 8/2008 | Mischler | G06K 9/2018 | 382/163 |
| 2009/0046332 A1* | 2/2009 | Kagawa | H04N 1/6058 | 358/520 |
| 2009/0231645 A1* | 9/2009 | Hayashi | H04N 1/00002 | 358/520 |
| 2010/0303351 A1* | 12/2010 | Umeda | H04N 1/60 | 382/167 |
| 2011/0279703 A1* | 11/2011 | Lee | H04N 9/735 | 348/223.1 |

\* cited by examiner

FIG. 6

| ORIGINAL | Normal Copy | Specified Color Removal (Chromatic Color) | Specified Color Removal (Achromatic Color) |
|---|---|---|---|
| There is dark chromatic streak on dark achromatic background. | | | |
| There is dark achromatic streak on dark chromatic background. | | | ← Conspicuous |
| There is light chromatic streak on light achromatic background. | | | |
| There is light achromatic streak on light chromatic background. | | | |

FIG. 10

| Index | INPUT R | INPUT G | INPUT B | OUTPUT R | OUTPUT G | OUTPUT B |
|---|---|---|---|---|---|---|
| 0 | 0 | 0 | 0 | 0 | 0 | 0 |
| 1 | 0 | 0 | 15 | 0 | 0 | 19 |
| 2 | 0 | 0 | 30 | 0 | 0 | 39 |
| ... | | | | | | |
| ... | | | | | | |
| 15 | 0 | 0 | 255 | 0 | 0 | 255 |
| 16 | 0 | 15 | 0 | 0 | 19 | 0 |
| 17 | 0 | 15 | 15 | 0 | 20 | 15 |
| ... | | | | | | |
| ... | | | | | | |
| 4094 | 255 | 255 | 240 | 252 | 251 | 240 |
| 4095 | 255 | 255 | 255 | 255 | 255 | 255 |

THREE DIMENSIONAL LUT

61

R (8bit), G (8bit), B (8bit) →

R' (8bit), G' (8bit), B' (8bit) →

STREAK POSITION

INTERPOLATION

REMOVAL

FIG. 15

IMAGE FORMING APPARATUS PERFORMING SPECIFIED-COLOR REMOVAL PROCESS, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus that performs a specified-color removal process, a control method therefor, and a storage medium storing a control program therefor.

Description of the Related Art

An image forming apparatus disclosed in Japanese Laid-Open Patent Publication (Kokai) No. 2011-188484 (JP 2011-188484A) generates color image data by scanning an original and prints a color image according to the color image data. Thereby, the color image can be copied.

Incidentally, there are some image forming apparatuses that are able to print an image while removing a specified removal color from a color image like the apparatus disclosed in the above-mentioned publication. In the above-mentioned publication, the specified removal color is altogether removed from the color image.

However, when the specified removal color is uniformly removed from a color image like the above-mentioned publication, an image component that is not included in an original image may appear conspicuously in the color image after the removal process. For example, when an original is scanned, an image component due to a defect that is not included in the original may be included due to dust on a reading position of a scanner. When the original is read while conveying the original, dust on the reading position causes a streak extended in a reading direction. In this case, the read position of the dust is specified and a process for interpolating the defect that occurs at the read position of the dust is applied to the read image.

However, a color component in an area used by the interpolation process becomes different from a color of the other image area that does not relate to the interpolation process. Since the color of the interpolated area is determined to be different from the other image area, the interpolated area remains in a processed image when a process for removing the color of the other image area is applied to the color image obtained through such an interpolation process. For example, when a streaky defect appears in a solid black image, the interpolation process may be applied using a color component of pixels surrounding the streak so as not to be conspicuous as a white line. Then, when black is removed from the color image interpolated in this way, only a gray streak remains in the processed image.

SUMMARY OF THE INVENTION

The present invention provides an image forming apparatus that is capable of improving a specified-color removal process.

Accordingly, a first aspect of the present invention provides an image forming apparatus including an obtaining unit configured to obtain color image data, a color specification unit configured to specify removal color, and a specified-color removal unit configured to remove color that is determined to be removed according to determination based on a brightness threshold and a first saturation threshold about the removal color from the color image data obtained.

Accordingly, a second aspect of the present invention provides a control method for an image forming apparatus obtaining color image data, the control method including a color specification step of specifying removal color, and a specified-color removal step of removing color that is determined to be removed according to determination based on a brightness threshold and a first saturation threshold about the removal color from the color image data obtained.

Accordingly, a third aspect of the present invention provides a non-transitory computer-readable storage medium storing a control program causing a computer to execute the control method of the second aspect.

The present invention is capable of improving the specified-color removal process.

Further features of the present invention will become apparent from the following description of exemplary embodiments with reference to the attached drawings.

BRIEF DESCRIPTION OF THE DRAWINGS

FIG. 6 is an explanatory view showing output images of a normal copy process and output images of copy processes including the specified-color removal processes shown in FIG. 5A and FIG. 5B in a case where a streak appears in a scanned color image.

FIG. 10 is an explanatory view showing a normal three-dimensional LUT (lookup table) used in a color-space conversion process.

FIG. 15 is an explanatory view showing output images of a normal copy process and output images of copy processes including the color conversion process in FIG. 14 in a case where a streak that is not included in an original appears in a scanned color image.

DESCRIPTION OF THE EMBODIMENTS

Figure 1:
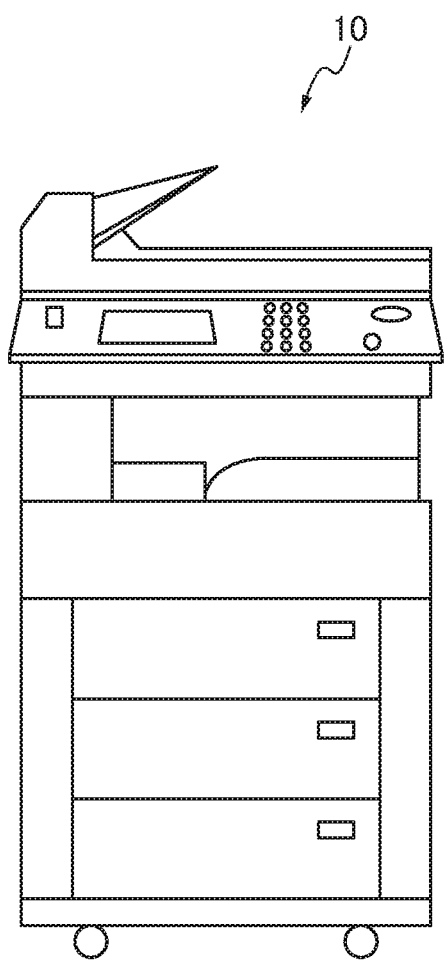
FIG. 1 is an external view showing an image forming apparatus according to a first embodiment of the present invention.

Hereafter, embodiments according to the present invention will be described in detail by referring to the drawings. However, configurations described in the following embodiments are examples, and the scope of the present invention is not limited by the configurations described in the embodiments.

FIG. 1 is an external view showing an image forming apparatus 10 according to a first embodiment of the present invention. The image forming apparatus 10 in FIG. 1 is a multifunctional peripheral that has a plurality of functions, such as a print function, a scan function, a copy function, and a facsimile function.

Figure 2:
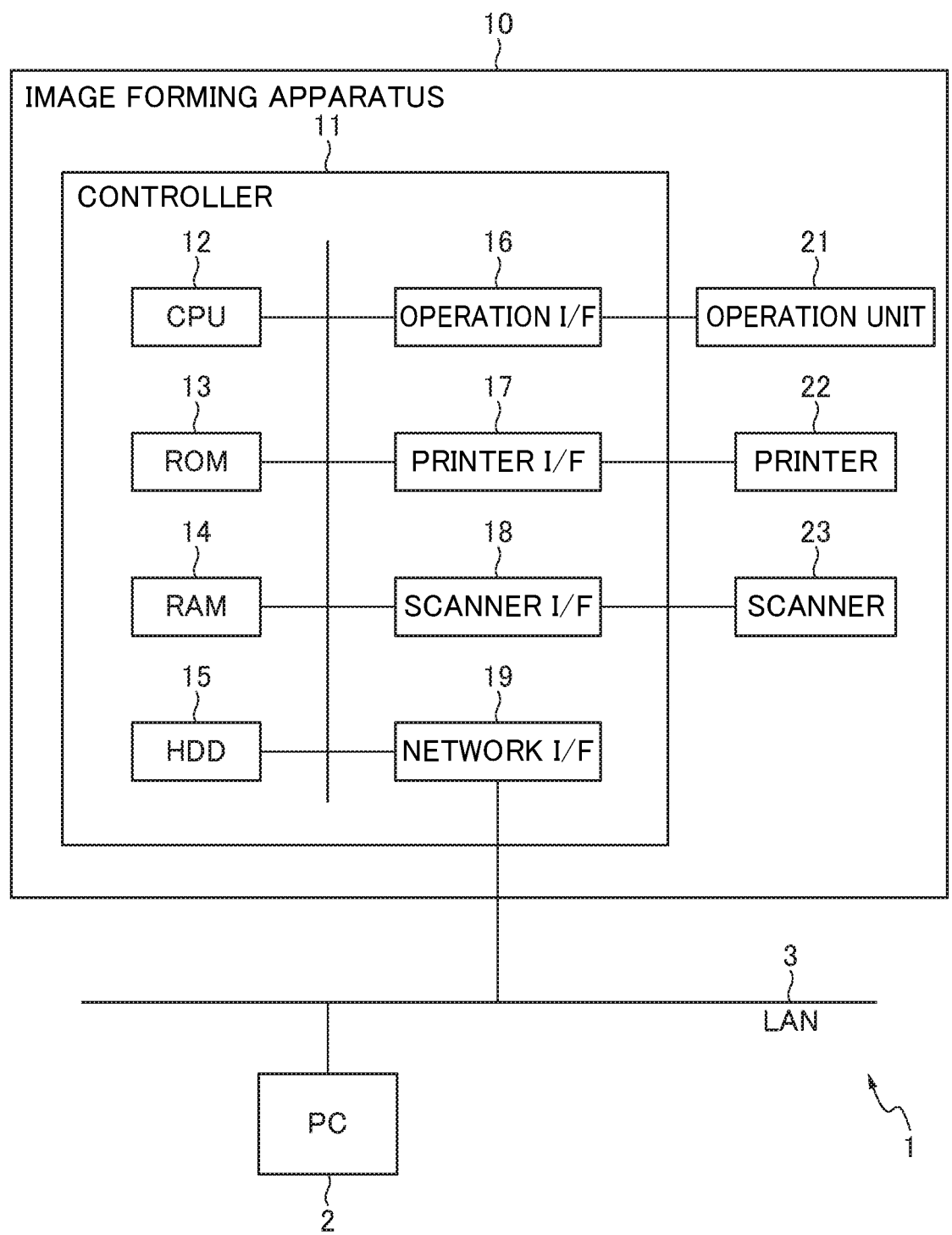
FIG. 2 is a schematic configuration view showing a print system including the image forming apparatus in FIG. 1.

FIG. 2 is a schematic configuration view showing a print system 1 including the image forming apparatus 10 in FIG. 1. The print system 1 shown in FIG. 2 has the image forming apparatus 10, a PC (personal computer) 2, and a LAN 3 that connects them mutually so that data communication will be available. The PC 2 sends color image data to the image forming apparatus 10 through the LAN 3. The color image data may be PDL data in which an image of a print target is described in the page description language (PDL), for example. The image forming apparatus 10 prints the received color image data onto a recording medium like a sheet. The image forming apparatus 10 in FIG. 2 has a controller 11, an operation unit 21, a printer 22, and a scanner 23.

The controller 11 includes a CPU 12 and controls actions of the entire image forming apparatus 10. The CPU 12 may be a single processor or may consist of a plurality of processors. The CPU 12 reads a control program stored in a ROM 13, and performs various control processes, such as a reading process and a transmission process. The RAM 413 is used as a main memory of the CPU 12 and a temporary memory area such as a work area. An HDD 15 stores color image data that is received or is generated internally, various programs, and various information tables, for example. An operation I/F 16 is an interface that is connected to the operation unit 21 for inputting and outputting data. The operation unit 21 has an LCD with a touch panel function and a keyboard like a ten-key pad, for example. The operation unit 21 functions as a user interface that receives various input operations from a user. The operation unit 21 outputs data indicating an operation content to the operation I/F 16 of the controller 11. It should be noted that the operation unit 21 may have a user authentication unit that accepts an authentication operation using an ID card (not shown), for example.

A printer I/F 17 is an interface that is connected to the printer 22 for inputting and outputting data. The printer 22 prints a full color image onto a recording medium like a sheet on the basis of color image data input from the controller 11 by an electrophotographic method. The full color image may be a graph painted solidly, a picture, etc. A scanner/F 18 is an interface that is connected to the scanner 23 for inputting and outputting data. The scanner 23 reads an image of an original set to an ADF and generates color image data (scanned image data). The scanner 23 outputs the generated color image data to the scanner I/F 18 of the controller 11. A network I/F 19 is an interface that connects the controller 11 of the image forming apparatus 10 to the LAN 3 for inputting and outputting data. The network I/F 19 receives color image data and information from external apparatuses, such as the PC2 on the LAN 3. The network I/F 19 sends color image data and information to other external apparatuses on the LAN 3. A cloud service server apparatus is an external apparatus, for example. Such an image forming apparatus 10 receives PDL data by the network I/F 19 of the controller 11 and converts the PDL data into color image data for printing by the controller 11. After that, the image forming apparatus 10 outputs the color image data for printing to the printer 22 from the printer I/F 17 of the controller 11 and prints a color image onto a recording medium by the printer 22.

Next, actions of the image forming apparatus 10 in a copy process will be described as an example. A user operates the operation unit 21 to set the image forming apparatus 10 for the copy process. The controller 11 of the image forming apparatus 10 executes a pre-process for the copy process in response to the user's operation. For example, when the user selects a copy function in a main menu displayed on the operation unit 21 initially, the controller 11 displays a copy setting screen on the operation unit 21. On the copy setting screen, the user selects color or monochrome, a print magnification, a size of a recording medium, the number of copies, etc. The controller 11 stores the selected setting contents in the HDD 15 etc. Moreover, a special function can be selected on the copy setting screen.

Figure 3A:
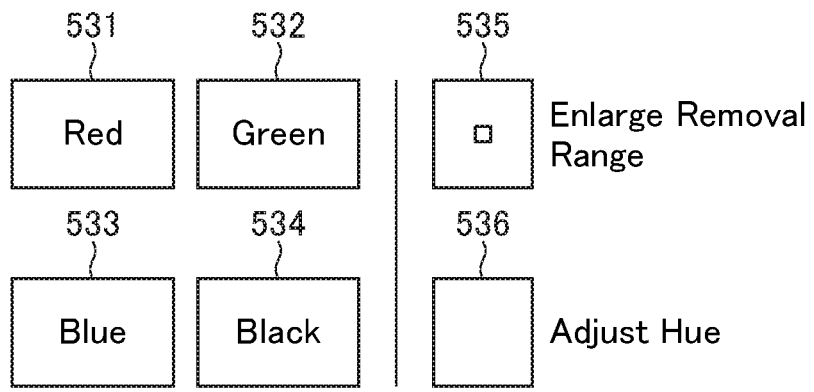
FIG. 3A and FIG. 3B are views respectively showing a removal-color selection screen and a hue adjustment screen.
Figure 3B:
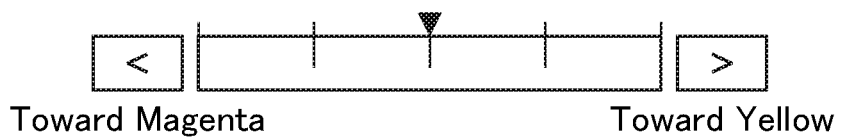

FIG. 3A is a view showing a removal color selection screen displayed on the operation unit 21. When printing an image onto a recording medium by removing a specified color from an original to be copied, the user designates a removal color on the screen shown in FIG. 3A. In FIG. 3A, the removal color is selected from among red, blue, and green that are chromatic color and black that is achromatic color by selection buttons. Moreover, FIG. 3B is a view showing a hue adjustment screen in a case where the red is specified as the removal color. In FIG. 3B, the user is able to designate the hue of the removal color finely. When the setting for the copy function completes, the user operates a start button of the operation unit 21. Thereby, the controller 11 as a color specification unit generates a scan job, an image processing job, and a print job for the copy process on the basis of the setting contents at the time when the start button is operated. The scan job makes the scanner 23 read an original. The scanner 23 executes the scan job to generate color image data, for example. The image processing job makes the controller 11 process the color image data generated by scanning. When the scanner 23 finishes generating the color image data, the controller 11 executes the image processing job to generate the color image data for printing. The print job makes the printer 22 print the color image data onto a recording medium. When the controller 11 finishes generating the color image data for printing by the image processing job, the printer 22 executes the print job. The printer 22 prints a color image onto a recording medium on the basis of the color image data for printing. Thereby, the image forming apparatus 10 reads the color image of the original and forms the image corresponding to the read color image on the recording medium. In this case, when the removal color is specified on the selection screen in FIG. 3A, the controller 11 generates color image data for printing by removing the color component of the specified removal color from the color image obtained by scanning the original.

Figure 4A:
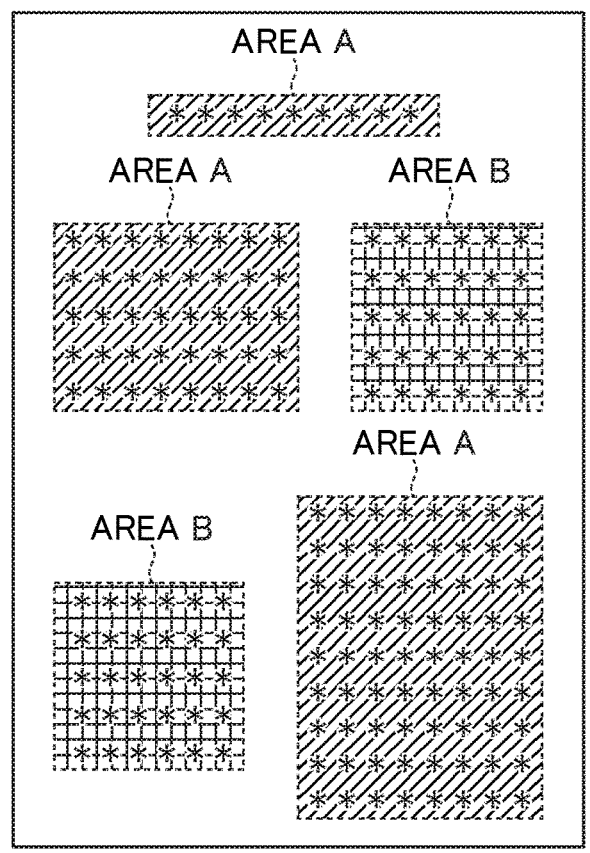
FIG. 4A and FIG. 4B are explanatory views for a specified-color removal process.
Figure 4B:
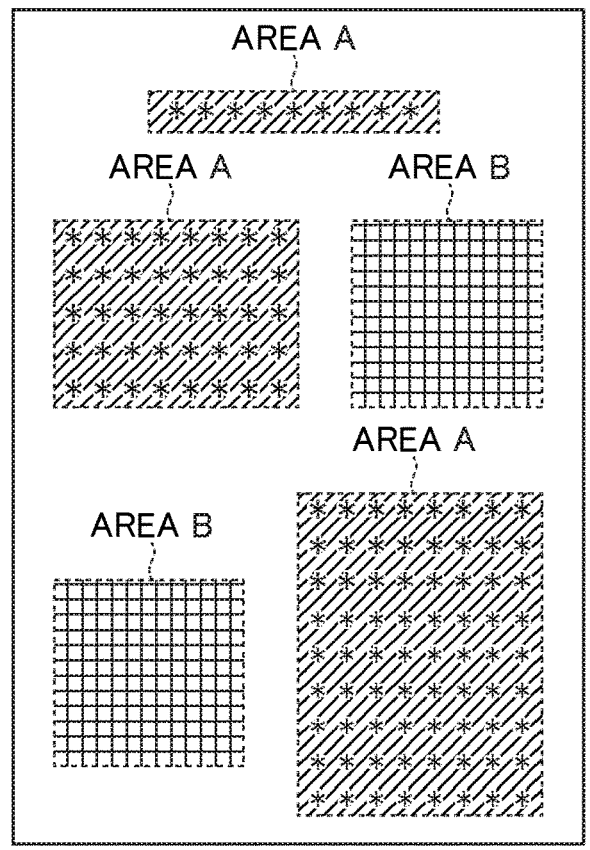

FIG. 4A and FIG. 4B are explanatory views for a specified-color removal process. An original shown in FIG. 4A includes black characters printed in areas A that are shown by left-downward-slant-line patterns and red characters printed in areas B shown by lattice patterns. In the drawings, each character is denoted by an asterisk. When such an original is copied while designating red as the removal color, an image shown in FIG. 4B is printed onto the recording medium. In the image in FIG. 4B, the black characters are printed in the areas A and no red characters are printed in the areas B.

Figure 5A:
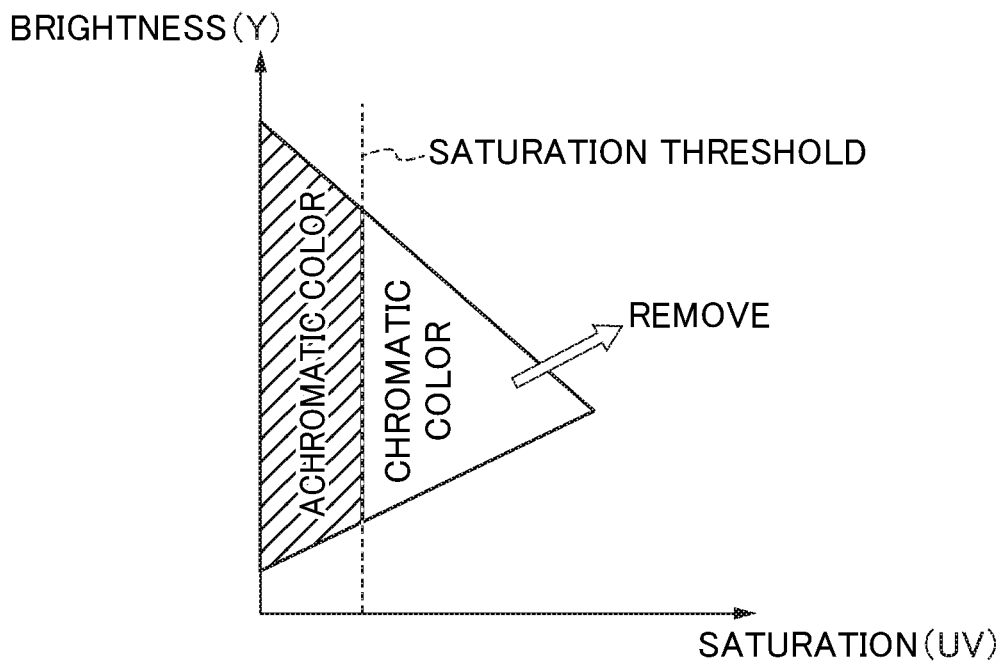
FIG. 5A and FIG. 5B are the explanatory views showing a basic approach of the specified-color removal process.
Figure 5B:
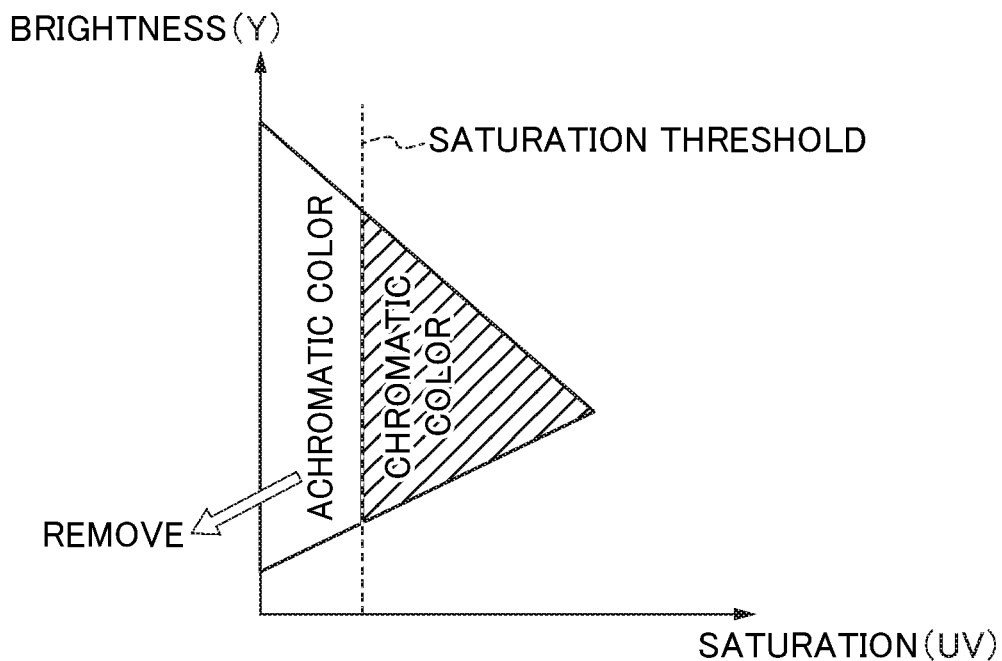

Next, a basic process of the specified-color removal process of color image data will be described by referring to FIG. 5A and FIG. 5B. FIG. 5A is an explanatory view of a process for removing chromatic color of red, blue, or green. FIG. 5B is an explanatory view of a process for removing achromatic color. FIG. 5A and FIG. 5B are the explanatory views of a color plane in which a horizontal axis represents saturation (UV) and a vertical direction represents brightness (Y). A vertex near an origin in a triangular color region represents black, the other vertex in the vertical axis represents white, and the remaining vertex represents pure color. Accordingly, a black density decreases upward along the vertical axis in the color region. A red component increases as approaching to the vertex of the pure color (red, for example) along the lower side of the triangular color region. The region of the left side of a predetermined saturation threshold in the drawing is an achromatic color region. The region on the right side of the saturation threshold in the drawing is a chromatic color region. When removing chromatic color that is red, blue, or green, it is determined whether color of each pixel of the color image data is included in the chromatic color region on the right side of the saturation threshold in the drawing. Then, when the color is included in the chromatic color region, the color of the pixel is converted into white and removed. Moreover, when the color of the pixel is included in the achromatic color region on the left side of the saturation threshold in the drawing, the color component of the pixel remains. The specified chromatic color is removed from the scanned color image by executing this process for all the pixels constituting the color image.

However, when an image component that is not included in an original is included in a color image read with the scanner due to dust at the reading position of the scanner, for example, and when the specified removal color is uniformly removed from the color image, the image component that is not included in the original may conspicuously appear in the color image after applying the removal process.

FIG. 6 is an explanatory view showing output images of a normal copy process and output images of copy processes including the specified-color removal processes shown in FIG. 5A and FIG. 5B in a case where a streak that is not included in an original appears in a scanned color image. FIG. 6 shows twelve patterns of the output images of the color copy as a matrix of 4 rows and 3 columns. The first row shows a case where a scanned color image in which a dark chromatic color streak is formed on a dark achromatic blackish background is output. The second row shows a case where a scanned color image in which a dark achromatic blackish streak is formed on a dark chromatic color background is output. The third row shows a case where a scanned color image in which a light chromatic color streak is formed on a light achromatic whitish background is output. The fourth row shows a case where a scanned color image in which a light achromatic whitish streak is formed on a light chromatic color background is output. Then, when the normal copy process that does not specify a removal color is applied, a copy image of which a streak is inconspicuous is formed as shown in the first column because the density of the streak is close to the density of the background in any case. Against this, when chromatic color is specified as a removal color, only a background of the specified color or a black streak is removed as shown in the second column. Accordingly, when both the background and streak are formed by the dark color as shown in the first row and second row, the achromatic color background or the black streak remains. In this case, the streak is formed clearly and conspicuously. Moreover, when achromatic color is specified as a removal color, only a dark achromatic blackish background or a black streak is removed as shown in the third column. Accordingly, when both the background and streak are formed by the dark color as shown in the first row and second row, the chromatic color background or the black streak remains. In this case, the streak is formed clearly and conspicuously. Thus, the streak that is not included in the original is formed. When density of the background is low as shown in the third row and fourth row, the streak is not so much conspicuous even if only the background or the streak remain similarly.

Figure 7:
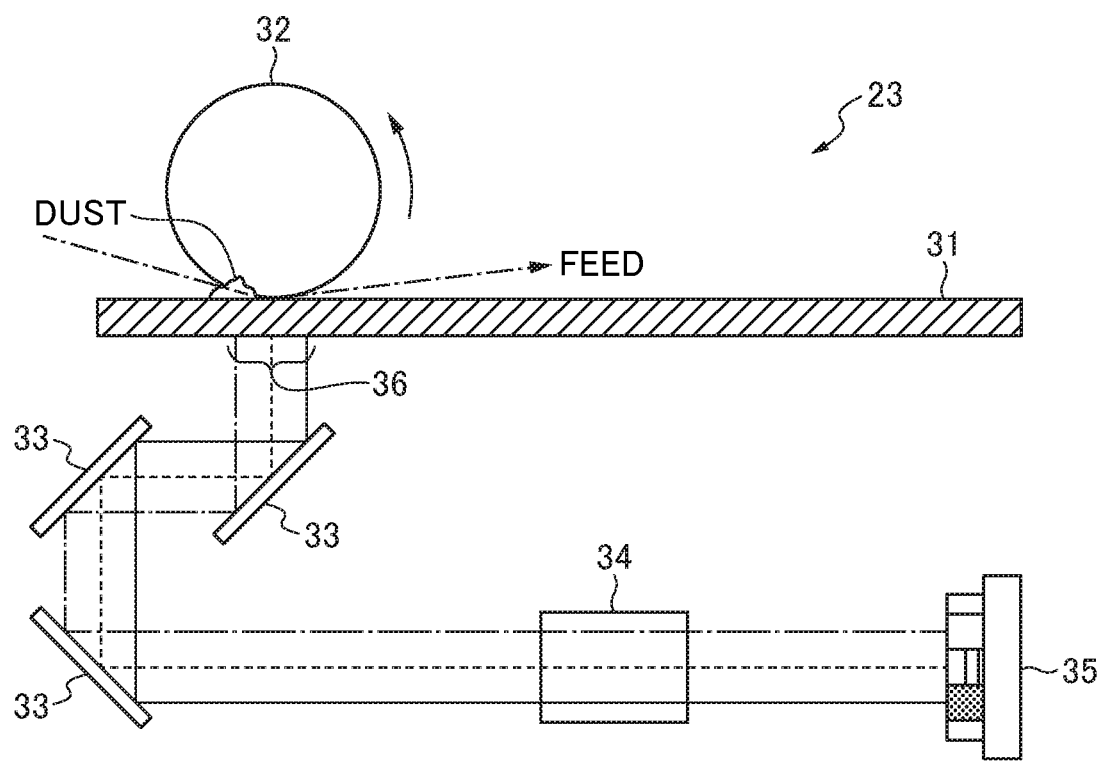
FIG. 7 is an explanatory view showing a schematic configuration of a scanner of the image forming apparatus in FIG. 1.

Next, a cause that a streak is formed on a sheet to which a color image is copied will be described in detail. FIG. 7 is an explanatory view schematically showing the configuration of the scanner 23. The scanner 23 is arranged in the upper portion of the image forming apparatus 10 in FIG. 1. FIG. 7 shows a read glass 31, a conveying roller 32 of the ADF, a plurality of reflective mirrors 33, an image forming lens 34, and a color line sensor 35 that constitute the scanner 23. The conveying roller 32 of the ADF is rotatably arranged upon the read glass 31. Thereby a read position 36 of an original is defined on the read glass 31. When a scan job is executed, the conveying roller 32 sends the original conveyed from an original tray of the ADF so as to pass the read position 36. The color line sensor 35 is positioned and arranged under the read glass 31. The plurality of reflective mirrors 33 and the image forming lens 34 constitute a read optical system between the read position 36 of an original and the color line sensor 35. The color line sensor 35 receives read light from the original that passes through the read position 36 by being conveyed and generates the color image data that the color image of the original is scanned. The scanner 23 outputs the scanned color image data to the controller 11 of the image forming apparatus 10. When the dust has adhered to the read position 36 as shown in FIG. 7, a streaky defect appears in the color image that is read while conveying the original.

Figure 8:
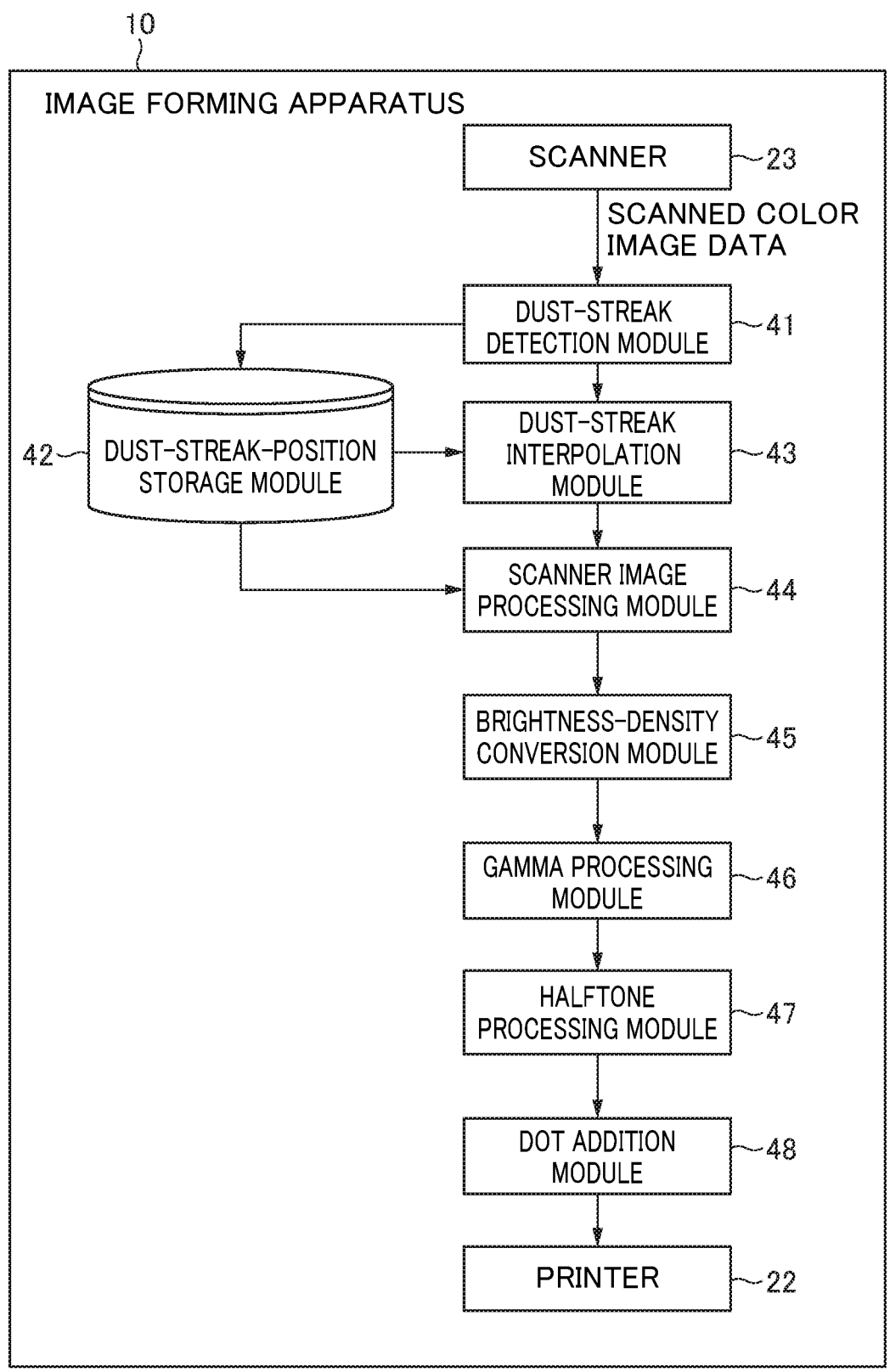
FIG. 8 is an explanatory view showing processing modules achieved in a controller of the image forming apparatus in FIG. 1.

FIG. 8 is an explanatory view showing processing modules achieved in the controller 11 when an image processing job is executed following a scan job. When an image processing job is executed, a dust-streak detection module 41, a dust-streak-position storage module 42, a dust-streak correction module 43, a scanner image processing module 44, a brightness-density conversion module 45, a gamma processing module 46, a halftone processing module 47, and a dot addition module 48 are achieved in the controller 11. These processing modules are achieved when the CPU 12 of the image forming apparatus 10 runs a control program. Moreover, the scanner 23 and the printer 22 of the image forming apparatus 10 are also illustrated in FIG. 8. The dust-streak detection module 41 as a defect determination unit obtains color component values of R, G, and B obtained by the color line sensor 35 of the scanner 23 and detects whether a defect due to a dust streak appears in the scanned color image. A position of a defect due to a dust streak is specified as a position in a direction that intersects perpendicularly with the conveyance direction of the original in the read position 36. The dust-streak-position storage module 42 stores the dust streak position detected by the dust-streak detection module 41. The dust-streak correction module 43 executes a process for interpolating a pixel at a dust streak position using color component values of adjacent pixels on the basis of the dust streak position stored in the dust-streak-position storage module 42.

Figure 9:
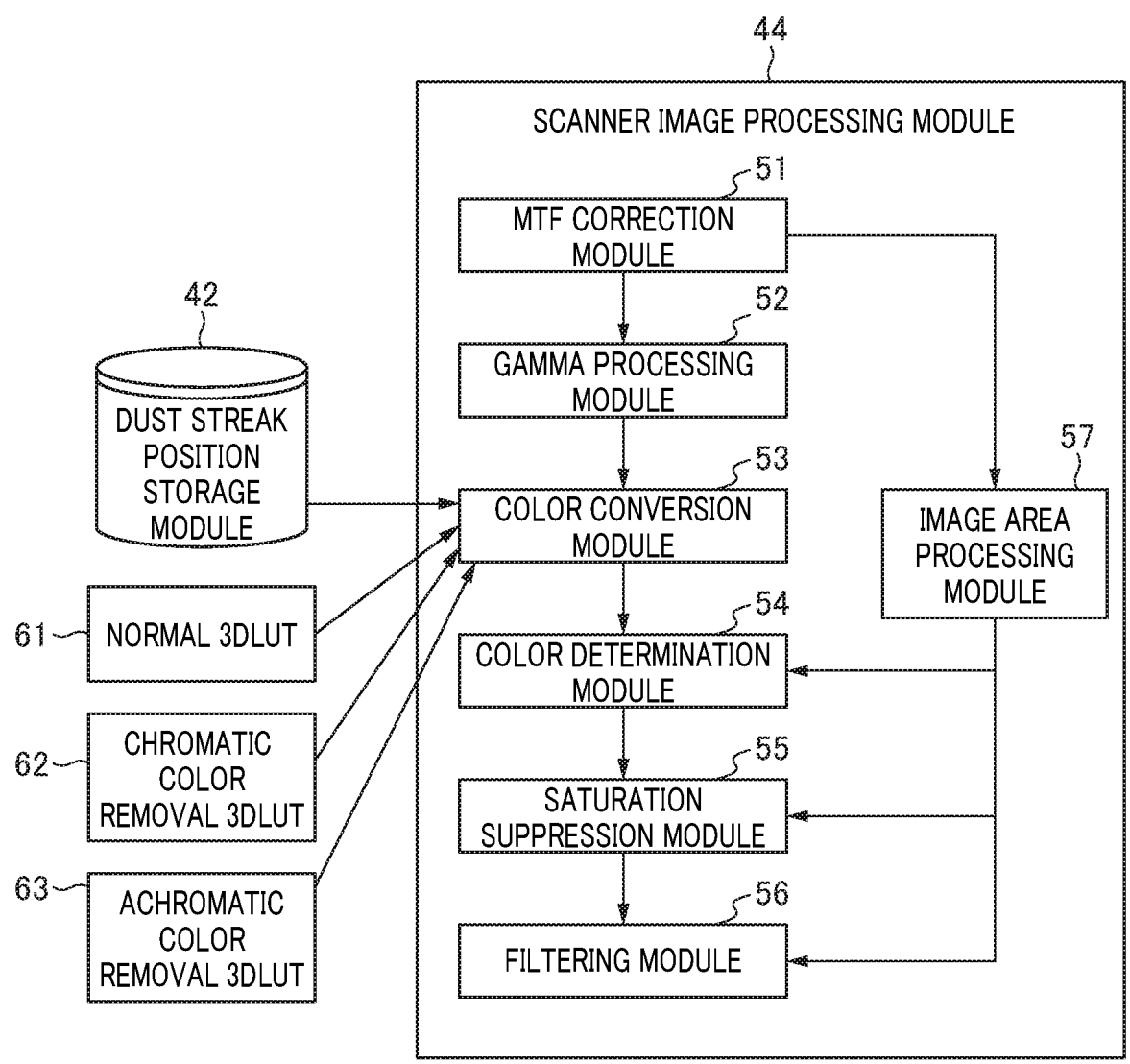
FIG. 9 is an explanatory view showing detailed processing modules of a scanner image processing unit in FIG. 8.

FIG. 9 is an explanatory view showing detailed processing modules of the scanner image processing unit 44 in FIG. 8. As shown in FIG. 9, the scanner image processing module 44 has an MTF correction module 51, a gamma processing module 52, a color conversion module 53, a color determination module 54, a saturation suppression module 55, a filtering module 56, and an image-area processing module 57. The MTF correction module 51 corrects MTF of reading that varies with reading speed. The image-area processing module 57 discriminates image areas, such as characters and photos, using the image after the MTF correction process and outputs image-area information. The gamma processing module 52 executes a one-dimensional gamma correction process corresponding to a characteristic of the scanner 23. The color conversion module 53 converts color of each pixel of an image from a color space of the scanner 23 to a color space that is independent of the scanner 23 by referring to a three-dimensional lookup table (3DLUT) mentioned later. The color determination module 54 determines whether color of a target image area is chromatic color or achromatic color using the image-area information. The saturation suppression module 55 corrects amounts of R, G, and B components in the image area of which the color is determined as achromatic color according to the image-area information. For example, when the color determination module 54 determines as achromatic color, the saturation suppression module 55 equalizes the amounts of R, G, and B components, for example. The filtering module 56 performs smoothing, edge emphasis, etc. according to the image-area information.

The halftone processing module 47 in FIG. 8 converts a gradation value (for example, 256 gradations) of the color image data into a gradation value (for example, 2 gradation) of image data (half tone image data) that the printer 22 is able to output. The dot addition module 48 adds a dot defined beforehand. According to these series of processes, the controller 11 converts the scanned color image into the color image that the printer 22 is able to output. The controller 11 outputs the generated color image data for printing to the printer 22. The printer 22 executes a print job and prints the color image for printing onto a recording medium.

FIG. 10 is an explanatory view showing a normal three-dimensional LUT 61 used in a color-space conversion process. The normal three-dimensional LUT 61 in FIG. 10 is used when an RGB-three-dimensional color space of the scanner 23 at the input side is converted into another RGB-three-dimensional color space at the output side that is available by the printer 22. The color space conversion process converts R, G, and B signals that have characteristics depending on a device into R', G', and B' signals that are independent of the device. Moreover, the normal three-dimensional LUT 61 in FIG. 10 is an example that thins out values in the color space at the input side per "15". In this case, the normal three-dimensional LUT has 4096 conversion records. Each conversion record has upper limit values of color component values of R, G, and B at the input side and corresponding color component values of R, G, and B at the output side. The gradation number of each color component is thinned out to ¹⁄₁₆. For example, the color conversion module 53 converts R, G, and B signals of (0, 0, 15) at the input side into R, G, and B signals of (0, 0, 19) using the normal three-dimensional LUT 61.

Figure 11A:
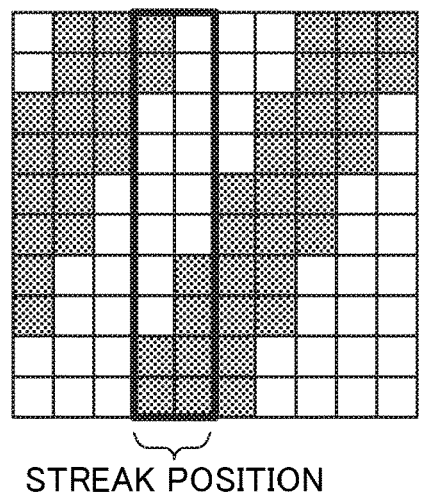
FIG. 11A, FIG. 11B, and FIG. 11C are explanatory views showing a color-image conversion process in a case where dust adheres to a read position of the scanner in FIG. 9.
Figure 11B:
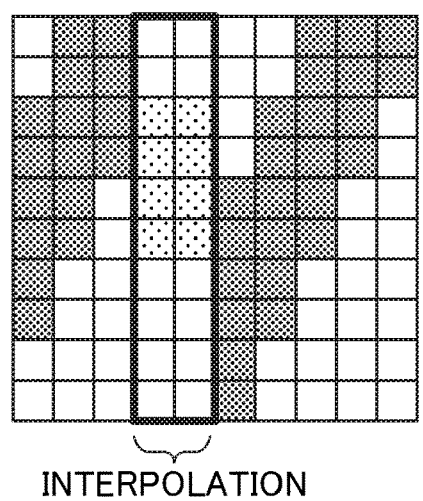
Figure 11C:
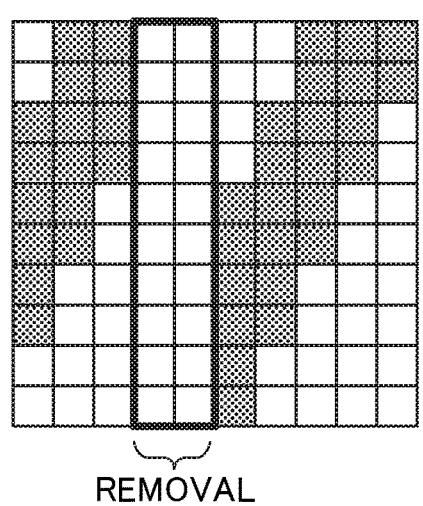

FIG. 11A, FIG. 11B, and FIG. 11C are explanatory views showing a color-image conversion process in a case where dust adheres to the read position 36 of the scanner 23 in FIG. 7. When dust adheres to the read position 36 at the time of reading an original by the scanner 23, the dust-streak detection module 41 in FIG. 8 detects a dust streak position on the basis of the scanned color image. The dust-streak-position storage module 42 stores the dust streak position detected by the dust-streak detection module 41. The dust-streak correction module 43 executes a process for interpolating a pixel at a dust streak position using color component values of adjacent pixels on the basis of the dust streak position stored in the dust-streak-position storage module 42. A color image of an original shown in FIG. 11A has a plurality of linear image areas, so that white and black areas are formed alternately. When a defect due to a dust streak appears in a color image that is obtained by scanning the original in FIG. 11A, the scanner image processing module 44 forms a color image by interpolating pixels at a streak position in which a defect appears using colors of adjacent pixels as shown in FIG. 11B. The color of the pixels at the streak position of which the defect is interpolated are not black (original color in a case where no defect appears) but become chromatic color near black, for example. Then, when the specified-color removal process shown in FIG. 5A is applied to the image in FIG. 11B while specifying the chromatic color at the streak position as the removal color, the color of the pixels at the defected streak position is replaced with white and removed as shown in FIG. 11C. As a result, the streak that does not appear clearly in the original in FIG. 11A and color image in FIG. 11B is clearly formed in the color image in FIG. 11C. On the contrary, when the specified-color removal process shown in FIG. 5B is executed while specifying black as the removal color, the color of the pixels at the defected streak position remains. Accordingly, the image forming apparatus 10 of the first embodiment improves the specified-color removal process.

Figure 12A:
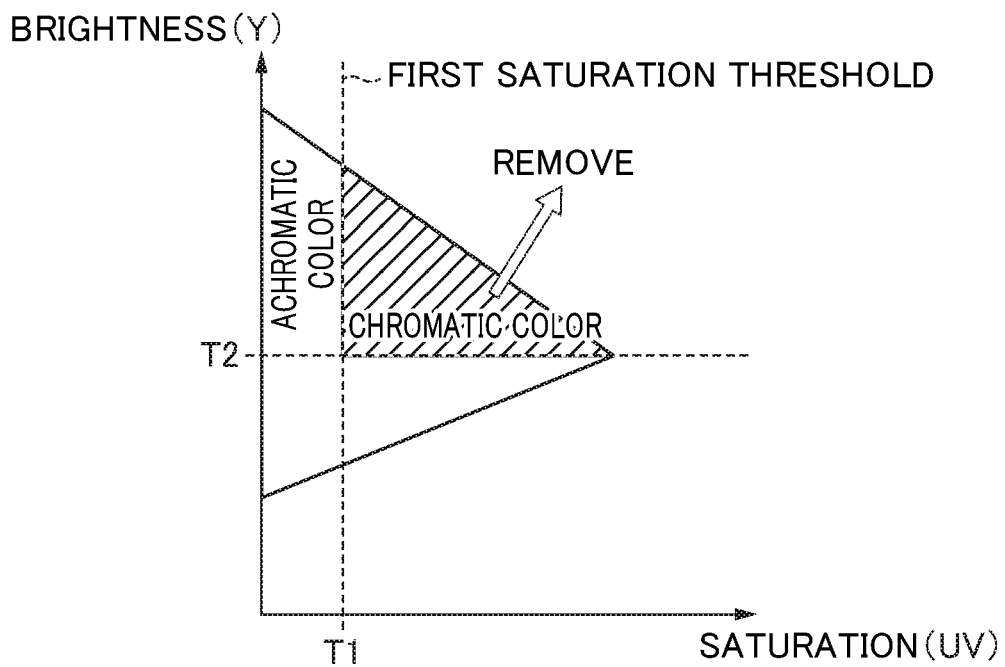
FIG. 12A and FIG. 12B are views for describing a basic approach of a specified-color removal process in the first embodiment.
Figure 12B:
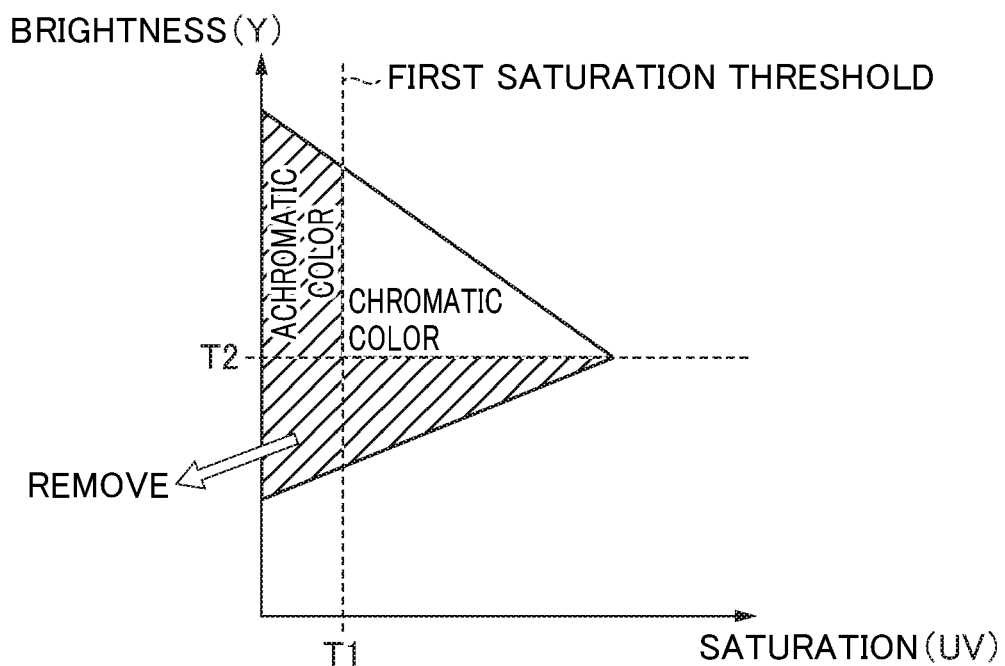

FIG. 12A and FIG. 12B are views for describing a basic approach of the specified-color removal process in the first embodiment. FIG. 12A is an explanatory view of a case for removing chromatic color. FIG. 12B is an explanatory view of a case for removing achromatic color (black). In FIG. 12A and FIG. 12B, a horizontal axis represents saturation (UV) and a vertical axis represents brightness (Y). A vertex near an origin in a triangular color region represents black, the other vertex in the vertical axis represents white, and the remaining vertex represents pure color. A first saturation threshold T1 and a brightness threshold T2 are defined to the triangular color region. The first saturation threshold T1 is a threshold that divides the triangular color region into chromatic color and achromatic color. The left side of the first saturation threshold T1 is a region of a small saturation value and includes achromatic color, such as black, white, and gray. The right side of the first saturation threshold T1 is a region of a large saturation value and includes chromatic color. The brightness threshold T2 is a threshold that divides the chromatic color region into a dark chromatic color region and a light chromatic color region. Then, when chromatic color is removed, the color in the light chromatic color region that is more than the brightness threshold and is more than the first saturation threshold is converted into colorlessness (white) and is removed as shown by hatching in FIG. 12A. Accordingly, when a dark chromatic color streak is formed on a dark achromatic color background, for example, both of them remain without being removed.

Moreover, when achromatic color is removed, the achromatic color that is less than the first saturation threshold and the dark chromatic color that is less than the brightness threshold are converted into colorlessness (white) and are removed as shown by hatching in FIG. 12B. Accordingly, when a dark chromatic color streak is formed on a dark achromatic color background, for example, both of them are removed.

Figure 13:
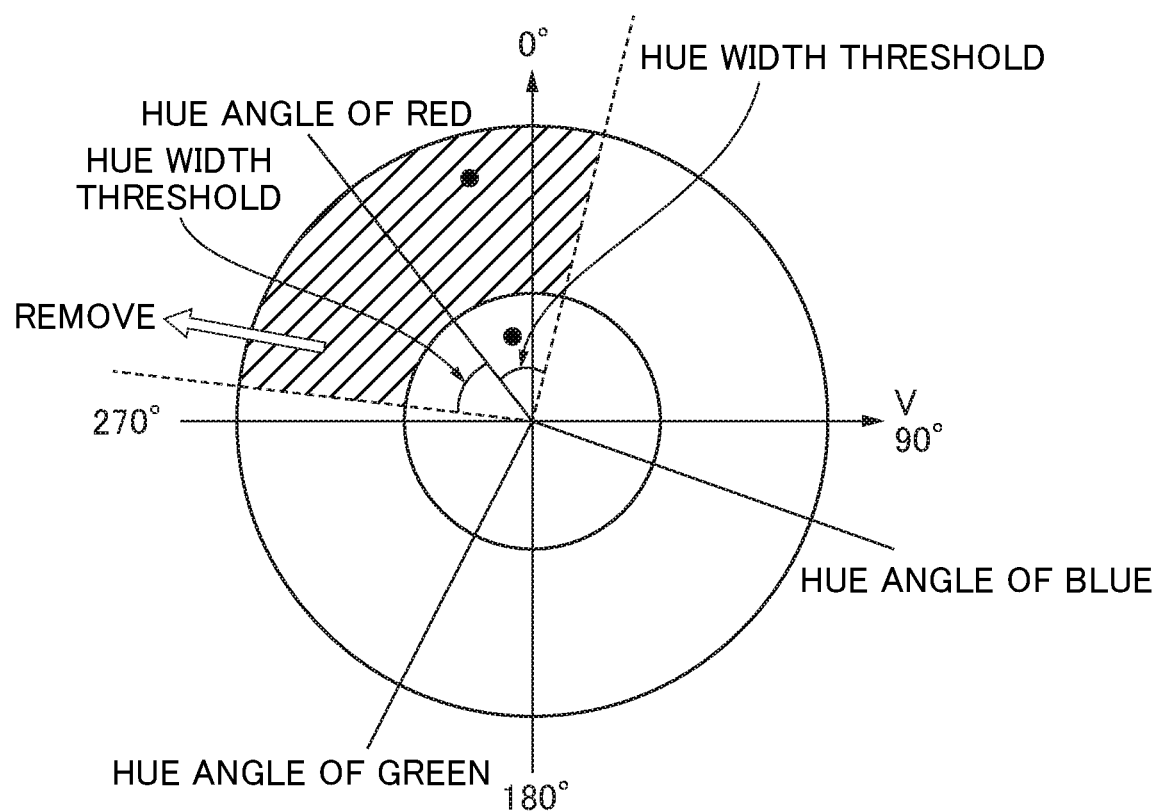
FIG. 13 is a view showing a hue circle on a color difference plane.

FIG. 13 is a view showing a hue circle on a color difference plane. FIG. 13 shows a red hue angle, a blue hue angle, and a green hue angle. When red is specified as a removal color, the color within angular ranges each of which corresponds to a hue width threshold at both sides centering around the red hue angle is subjected to the removal process. In the first embodiment, a removal-oriented three-dimensional lookup table in which values at the output side are changed from the normal three-dimensional lookup table 61 on the basis of the way of thinking shown in FIG. 12A, FIG. 12B, and FIG. 13 is used. The removal three-dimensional lookup table is stored in the storage unit like the HDD 15 together with the normal three-dimensional lookup table 61 in FIG. 10 for converting a color component value of each pixel. The removal-oriented three-dimensional lookup table is changed from the normal three-dimensional lookup table 61 in FIG. 10 so that a value at the output side corresponding to the removal color will be changed to the value indicating white according to the way of thinking shown in FIG. 12A, FIG. 12B, and FIG. 13. A removal-oriented three-dimensional lookup table for removing black should just change a value at the output side according to the way of thinking shown in FIG. 12A and FIG. 12B because black has no hue circle unlike chromatic color. Specifically, in the removal-oriented three-dimensional lookup table for removing achromatic black, a value at the output side of a conversion record for converting achromatic color that is less than the first saturation threshold T1 is a value indicating white. Similarly, a value at the output side of a conversion record for converting chromatic color near black that is less than the brightness threshold T2 is a value indicating white. In the removal-oriented three-dimensional lookup table for removing chromatic color, a value at the output side of a conversion record for converting chromatic color that is more than the brightness threshold and is more than the first saturation threshold T1 is a value indicating white.

Then, the color conversion module 53 in FIG. 9 executes the specified-color removal process on the occasion of the RGB-color-space conversion process. In this case, the color conversion module 53 selects and uses one of the normal three-dimensional lookup table 61 in FIG. 10, the removal-oriented three-dimensional lookup table 62 for removing chromatic color, and the removal-oriented three-dimensional lookup table 63 for removing achromatic color.

In this case, as shown in FIG. 9, the color conversion module 53 uses the dust-streak-position storage module 42, the normal three-dimensional lookup table 61, the removal-oriented three-dimensional lookup table 62 for removing chromatic color, and the removal-oriented three-dimensional lookup table 63 for removing achromatic color. The dust-streak-position storage module 42 stores a streak position, when an image has a streak. Three kinds of three-dimensional lookup tables are stored in the storage unit like the HDD 15. It should be noted that the removal-oriented three-dimensional lookup table 62 for removing chromatic color is used when the removal color specified according to a user's operation on the screen in FIG. 3A. The removal-oriented three-dimensional lookup table 62 for removing chromatic color and the removal-oriented three-dimensional lookup table 63 for removing achromatic color may be generated in the image forming apparatus 10 on the basis of the removal color set by a user by adjusting the normal three-dimensional lookup table 61 appropriately.

Figure 14:
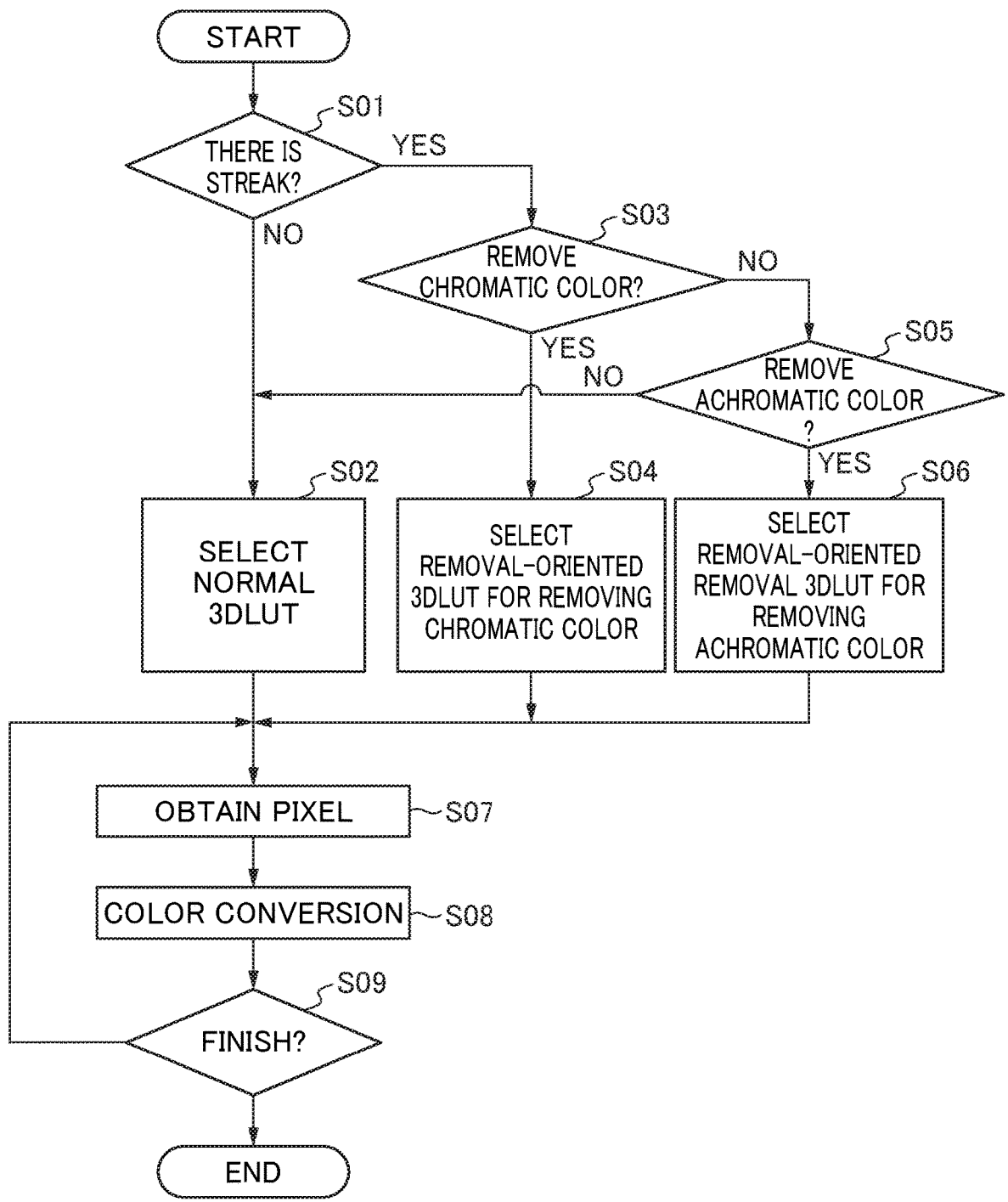
FIG. 14 is a flowchart showing a color conversion process by a color conversion module in FIG. 9.

FIG. 14 is a flowchart showing a color conversion process executed by the color conversion module 53 in FIG. 9. The color conversion module 53 in FIG. 9 executes the process in FIG. 14 when the scanner 23 scans an original and generates color image data. As shown in FIG. 14, the color conversion module 53 determines whether the image of the scanned color image data has a streak first (S01). The dust-streak-position storage module 42 in FIG. 9 stores information about the defect position (streak position) due to dust detected by the process of the dust streak detection module in FIG. 8. When the dust-streak-position storage module 42 stores the streak position, the color conversion module 53 may determine that the image has a streak. In the other case, it may be determined that the image has no streak. When the image has no streak, the color conversion module 53 selects the normal three-dimensional lookup table 61 (S02). When the image has a streak, the color conversion module 53 determines whether chromatic color is specified as the removal color (S03). When the chromatic color is specified, the color conversion module 53 selects the removal-oriented three-dimensional lookup table 62 for removing chromatic color (S04). When chromatic color is not specified as the removal color, the color conversion module 53 determines whether achromatic color is specified as the removal color (S05). When the achromatic color is specified, the color conversion module 53 selects the removal-oriented three-dimensional lookup table 63 for removing achromatic color (S06). When neither chromatic color nor achromatic color is specified as a removal color, the color conversion module 53 selects the normal three-dimensional lookup table 61 (S02).

After obtaining one of the three-dimensional lookup tables, the color conversion module 53 obtains a color component value of one pixel from the scanned color image data (S07). Next, the color conversion module 53 converts the color component value of the pixel to be processed using the selected three-dimensional lookup table (S08). After that, the color conversion module 53 determines whether the color conversion process has been performed about all the pixels of the scanned color image data (S09). When the color conversion process has not been performed about all the pixels, the color conversion module 53 returns the process to the step S07, obtains the following pixel, and executes the color conversion process. When the color conversion process has been performed about all the pixels, the color conversion module 53 finishes the process in FIG. 14. Then, when the color conversion is performed using the removal-oriented three-dimensional lookup table 62 for removing chromatic color, the chromatic color region that is more than the brightness threshold T2 and is more than the first saturation threshold T1 is converted into white and is removed as shown by hatching in FIG. 12A. When the color conversion is performed using the removal-oriented three-dimensional lookup table 63 for removing achromatic color, the achromatic color that is less than the first saturation threshold T1 and the dark chromatic color near black that is less than the brightness threshold T2 are converted into white and are removed as shown by hatching in FIG. 12B.

Figure 15:
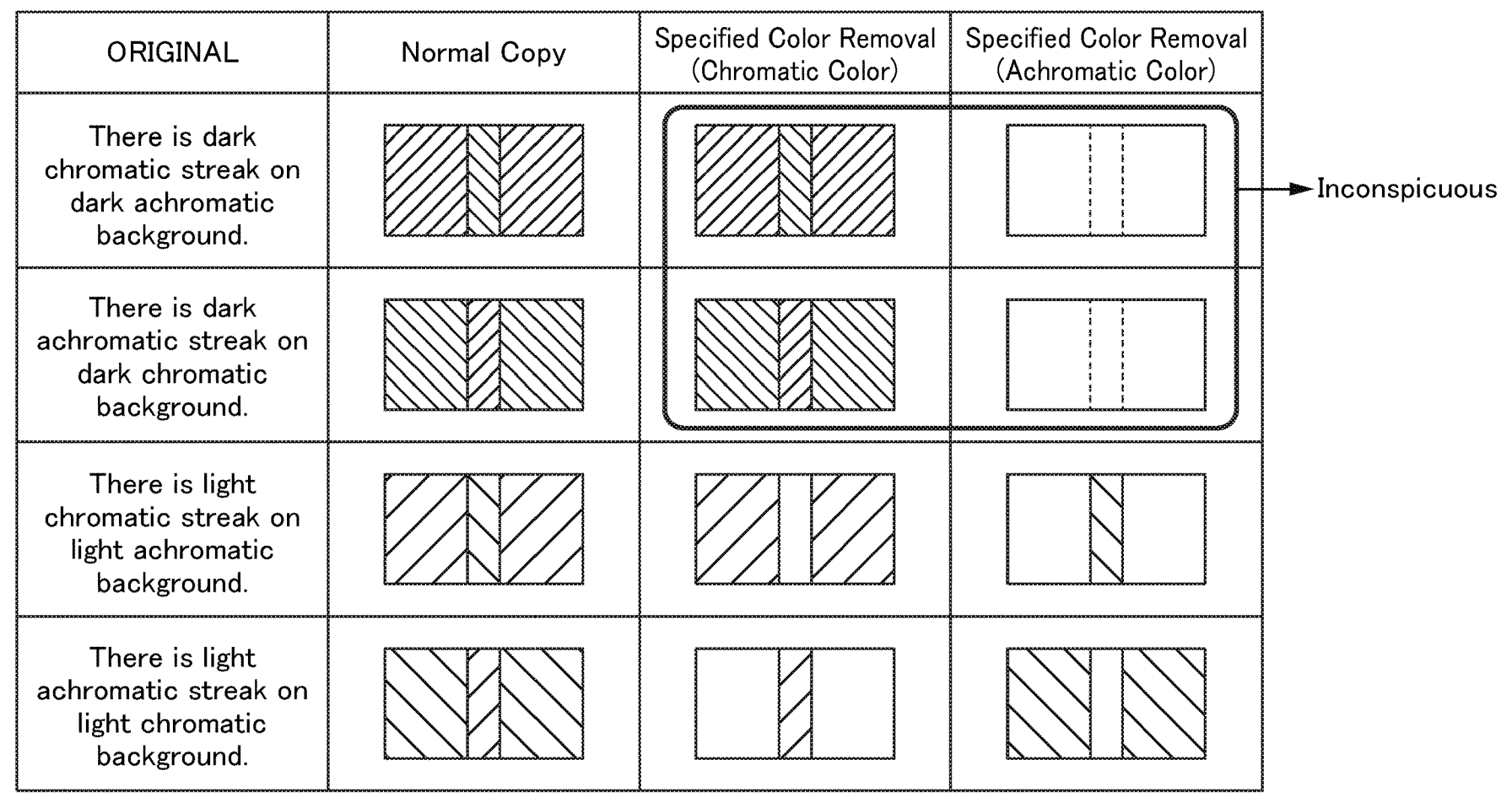

FIG. 15 is an explanatory view showing output images of a normal copy process and output images of a copy process including the color conversion process in FIG. 14 in a case where a streak that is not included in an original appears in a scanned color image. FIG. 15 shows twelve patterns of the output images of the color copy as a matrix of 4 rows and 3 columns as with FIG. 6. A color copy of each pattern corresponds to that in FIG. 6. Then, when the scanned color image in which a dark chromatic color streak is formed on a dark achromatic blackish background as shown in the first row is copied while removing chromatic color, both the black background and the dark chromatic color streak are not removed as shown in the second column. Moreover, when the scanned color image in which an achromatic black streak is formed on a dark chromatic color background as shown in the second row is copied while removing chromatic color, both the dark chromatic color background and the achromatic black streak are not removed as shown in the second column. Moreover, when the scanned color image in which a dark chromatic color streak is formed on a dark achromatic blackish background as shown in the first row is copied while removing achromatic color, both the black background and the dark chromatic color streak are removed as shown in the third column. Moreover, when the scanned color image in which an achromatic black streak is formed on a dark chromatic color background as shown in the second row is copied while removing achromatic color, both the dark chromatic color background and the achromatic black streak are removed as shown in the third column. Thus, the streaks are inconspicuous in the copied images.

As mentioned above, in the process for removing color specified as removal color from obtained color image data, color in a color region that is decided to be removed on the basis of the brightness threshold T2 and the first saturation threshold T1 is converted into colorlessness (white) and is removed in the first embodiment. Accordingly, when the color image in which a dark achromatic black streak is included on a dark chromatic color (removal color) background is obtained, for example, both of them remain without being removed in the first embodiment.

Against this, if the specified color removal is decided only on the basis of the first saturation threshold T1 for deciding chromatic color and achromatic color like FIG. 5A and FIG. 5B, the dark achromatic black streak is formed on the achromatic white background in the image after removing the removal color. As a result, the black streak becomes more conspicuous than that in the image before removing the specified color. The first embodiment enables not to form such an image easily.

In the first embodiment, when chromatic color is removed, only the color in the light chromatic color region that is more than the brightness threshold T2 and is more than the first saturation threshold T1 among the chromatic color specified as the removal color is converted into colorlessness (white) and is removed. Accordingly, when a color image in which a dark achromatic color streak is formed on a dark chromatic color (removal color) background is obtained, for example, both of them remain without being removed. Moreover, when a color image in which a dark chromatic color streak is included in a dark achromatic color background is obtained, both of them remain without being removed. This enables to avoid printing only the dark streak conspicuously in an image that has been subjected to the specified-color removal process.

Moreover, in the first embodiment, when achromatic color is removed, the achromatic color that is less than the first saturation threshold T1 and the dark chromatic color that is less than the brightness threshold T2 are converted into colorlessness (white) and are removed. Accordingly, when a color image in which a dark achromatic black streak is formed on a dark chromatic color (removal color) background is obtained, for example, both of them are removed. Moreover, when a color image in which a dark chromatic color streak is included in a dark achromatic black background is obtained, both of them are removed. This enables to avoid printing only the dark streak conspicuously in an image that has been subjected to the specified-color removal process.

In the first embodiment, a defect in an image of color image data to be obtained is determined and the removal process is executed according to decision on the basis of the brightness threshold T2 and the first saturation threshold T1 when there is a defect. Accordingly, even when an image has a defect like a streak, a suitable removal process is performed so that the defect like a streak may be inconspicuous.

Color image data about a scanned image of an image printed on a recording medium by the image forming apparatus 10 is obtained in the first embodiment. In this case, a color component of a pixel at a streak position is interpolated using color components of adjacent pixels of the streak position so that the streak appearing at a reading position of dust may be inconspicuous. The color components of the streak position and its adjacent part that are interpolated so that the streak may be inconspicuous are different from the original color component. In the first embodiment, even if color image data is obtained by scanning the image that has been subjected to such an interpolation process, the specified color is removed so that the interpolated streak may be inconspicuous.

Next, the image forming apparatus 10 according to a second embodiment of the present invention will be described. In the following description, different points from the image forming apparatus of the first embodiment will be mainly described.

Figure 16A:
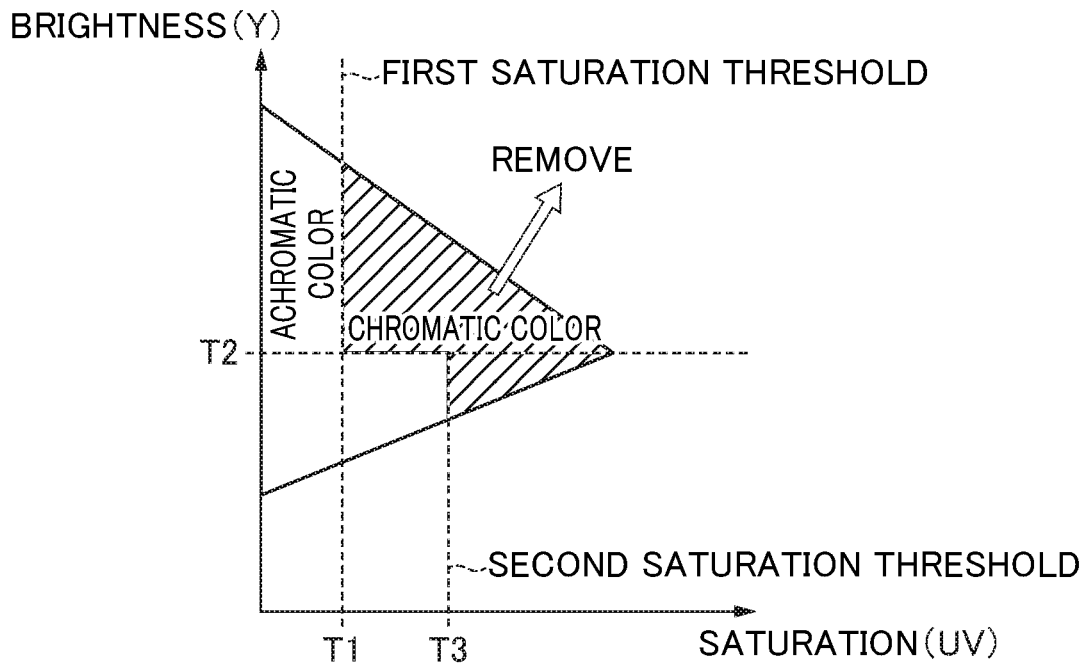
FIG. 16A and FIG. 16B are views for describing a basic approach of a specified-color removal process in a second embodiment.
Figure 16B:
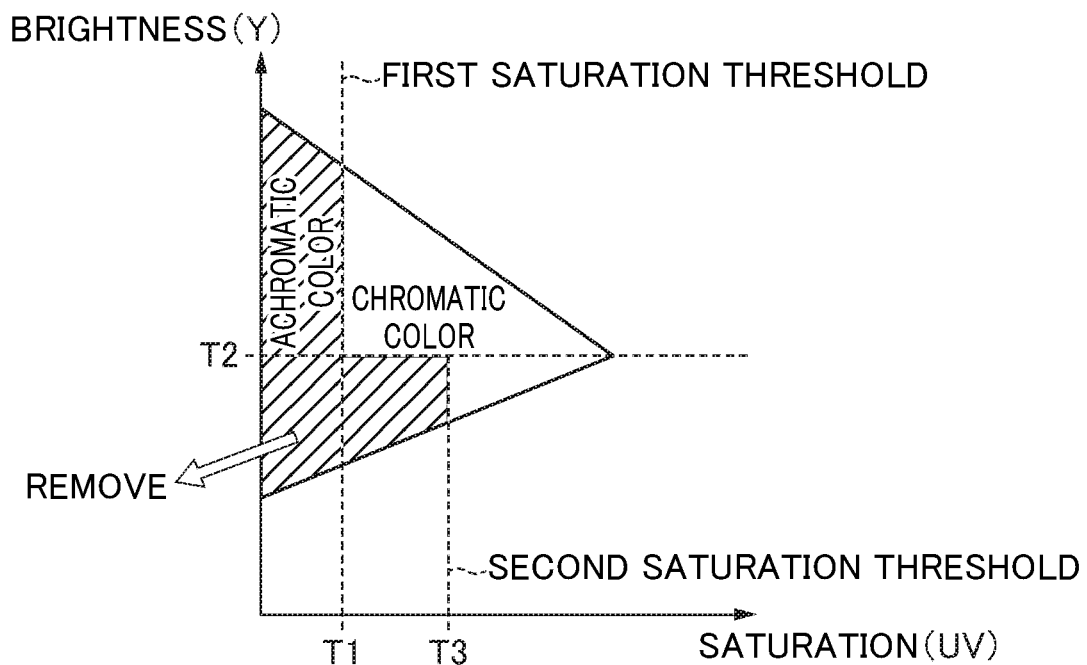

FIG. 16A and FIG. 16B are views for describing a basic approach of the specified-color removal process in the second embodiment. FIG. 16A is an explanatory view of a case for removing chromatic color. FIG. 16B is an explanatory view of a case for removing achromatic color (black). In FIG. 16A and FIG. 16B, a horizontal axis represents saturation (UV) and a vertical axis represents brightness (Y) as with FIG. 12A and FIG. 12B. A vertex near an origin in a triangular color region represents black, the other vertex in the vertical axis represents white, and the remaining vertex represents pure color. The first saturation threshold T1, a second saturation threshold T3, and the brightness threshold T2 are defined to the triangular color region. The second saturation threshold T3 defines a higher saturation than the first saturation threshold T1 that is a boundary between the chromatic color and the achromatic color. Then, the RGB color component values at the output side belonging to the color region removed in FIG. 16A and FIG. 16B in the removal-oriented three-dimensional lookup table 63 for removing achromatic color and the removal-oriented three-dimensional lookup table 62 for removing chromatic color are changed into colorlessness (white).

Then, the color conversion module 53 converts color in a color region that is determined to be removed according to determination based on the brightness threshold T2, first saturation threshold T1, and second saturation threshold T3 using the removal-oriented three-dimensional lookup tables into colorlessness (white) and removes. When chromatic color is removed, for example, color in a color region that is more than the brightness threshold T2 and is more than the first saturation threshold T1 and color in a color region that is less than the brightness threshold T2 and is more than the second saturation threshold T3 are converted into colorlessness (white) and are removed as shown by hatching in FIG. 16A. The color conversion module 53 performs this process using the removal-oriented three-dimensional lookup table 62 for removing chromatic color. Accordingly, when a dark chromatic color streak is formed on a dark achromatic color background, for example, both of them remain without being removed. This enables to remove the specified removal color in a wider range than the first embodiment without spoiling the effect that the streak is inconspicuous.

Moreover, when achromatic color is removed, for example, the achromatic color that is less than the first saturation threshold T1 and color in a chromatic color region that is less than the brightness threshold T2 and is less than the second saturation threshold T3 are converted into colorlessness (white) and are removed as shown by hatching in FIG. 16B. The color conversion module 53 performs this process using the removal-oriented three-dimensional lookup table 63 for removing achromatic color. Accordingly, when a dark chromatic color streak is formed on a dark achromatic color background, for example, both of them are removed. This enables to leave chromatic color that is not specified as the removal color in a wider range than the first embodiment without spoiling the effect that the streak is inconspicuous.

As mentioned above, it is determined whether the color region is less than the second saturation threshold T3 that defines a higher saturation than the first saturation threshold T1 that is a boundary between the chromatic color and the achromatic color, and the removal color is converted into colorlessness (white) and is removed corresponding to the determination in the second embodiment. Accordingly, when a color image in which a chromatic color streak component of medium density that is different from black and is inherently included is formed on a dark achromatic black background is obtained, the streak component is removed in accordance with the specification of the specified color in the second embodiment. The chromatic color streak component that is inherently included in the image and of which brightness is less than the brightness threshold T2 can be removed.

In the above-mentioned two embodiments, the specified removal color is removed in the color conversion process using the removal-oriented three-dimensional lookup table 62 for chromatic color and the removal-oriented three-dimensional lookup table 63 for achromatic color in addition to the normal three-dimensional lookup table 61. In addition, the specified-color removal process may be performed as a process other than the color conversion process, for example. In this case, the necessity of removal is determined by comparing a color component value of a pixel with the brightness threshold T2, first saturation threshold T1, and second saturation threshold T3 in a process of each pixel. Even in this case, the determination shown in FIG. 12A and FIG. 12B or FIG. 16A and FIG. 16B in the RGB color space enables to remove a specified color more appropriately as compared with a case where the specified color is removed by not using the toner corresponding to the specified color component in color printing of the printer 22.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-012741, filed Jan. 29, 2018, which is hereby incorporated by reference herein in its entirety.

What is claimed is:

1. An image forming apparatus comprising:
   an obtaining unit configured to obtain color image data;
   a color specification unit configured to specify color to be removed; and
   a specified-color removal unit configured to remove color that is determined to be removed according to a determination based on a brightness threshold and a saturation threshold about the color specified by the color specification unit from the color image data obtained by the obtaining unit,
   wherein in a case where the color specification unit specifies a chromatic color, the specified-color removal unit removes color that is more than the brightness threshold and is more than the saturation threshold in the chromatic color specified by the color specification unit, whereas the specified-color removal unit does not remove color that is equal to or less than the brightness threshold and is more than the saturation threshold in the chromatic color specified by the color specification unit.

2. The image forming apparatus according to claim 1, wherein in a case where the color specification unit specifies black, the specified-color removal unit removes color that is less than the saturation threshold or less than the brightness threshold, whereas the specified-color removal unit does not remove chromatic color that is equal to or more than the saturation threshold and equal to or more than the brightness threshold.

3. The image forming apparatus according to claim 1, wherein the specified-color removal unit removes color that is determined to be removed according to determination based on another saturation threshold that defines a higher saturation than the saturation threshold in addition to the brightness threshold and the saturation threshold.

4. The image forming apparatus according to claim 1, further comprising a defect determination unit configured to determine a defect about an image of the color image data obtained by the obtaining unit,
  wherein the specified-color removal unit executes a removal process according to determination based on the brightness threshold and the saturation threshold in a case where the image has a defect, and
  wherein the specified-color removal unit executes the removal process according to determination based on the saturation threshold in a case where the image has no defect.

5. The image forming apparatus according to claim 4, wherein the obtaining unit obtains color image data about a scanned image of an image printed on a recording medium, and
  wherein the defect determination unit determines a streak position about the image of the color image data obtained by the obtaining unit.

6. The image forming apparatus according to claim 4, wherein the specified-color removal unit executes the removal process during a color conversion process for converting a color component value of each pixel of the color image data using a three-dimensional lookup table,
  wherein the specified-color removal unit converts a color component value using a removal-oriented three-dimensional lookup table for converting a color component value of each pixel and removing the removal color in a case where the color image data has a defect, and
  wherein the specified-color removal unit converts a color component value using a normal three-dimensional lookup table for converting a color component value of each pixel in a case where the color image data has no defect.

7. The image forming apparatus according to claim 1, wherein the specified-color removal unit removes color determined to be removed in a color conversion process for converting a color component value of each pixel of the color image data using a three-dimensional lookup table.

8. The image forming apparatus according to claim 1, wherein the chromatic color is red.

9. The image forming apparatus according to claim 1, wherein the chromatic color is green.

10. The image forming apparatus according to claim 1, wherein the chromatic color is blue.

11. An image forming apparatus comprising:
  an obtaining unit configured to obtain color image data;
  a color specification unit configured to specify color to be removed; and
  a specified-color removal unit configured to remove color that is determined to be removed according to a determination based on a brightness threshold and a saturation threshold about the color specified by the color specification unit from the color image data obtained by the obtaining unit,
  wherein in a case where the color specification unit specifies black, the specified-color removal unit removes color that is less than the saturation threshold or less than the brightness threshold, whereas the specified-color removal unit does not remove color that is equal to or more than the saturation threshold and equal to or more than the brightness threshold.

12. A control method for an image forming apparatus obtaining color image data, the control method comprising:
  a color specification step of specifying color to be removed; and
  a specified-color removal step of removing color that is determined to be removed according to a determination based on a brightness threshold and a saturation threshold about the color specified in the color specification step from the color image data obtained,
  wherein in a case where chromatic color is specified in the color specification step, color that is more than the brightness threshold and is more than the saturation threshold in the chromatic color specified in the color specification step is removed in the specified-color removal step, whereas color that is equal to or less than the brightness threshold and is more than the saturation threshold in the chromatic color specified in the color specification step is not removed in the specified-color removal step.

13. A non-transitory computer-readable storage medium storing a control program causing a computer to execute a control method for an image forming apparatus obtaining color image data, the control method comprising:
  a color specification step of specifying color to be removed; and
  a specified-color removal step of removing color that is determined to be removed according to a determination based on a brightness threshold and a saturation threshold about the color specified in the color specification step from the color image data obtained,
  wherein in a case where chromatic color is specified in the color specification step, color that is more than the brightness threshold and is more than the saturation threshold in the chromatic color specified in the color specification step is removed in the specified-color removal step, whereas color that is equal to or less than the brightness threshold and is more than the saturation threshold in the chromatic color specified in the color specification step is not removed in the specified-color removal step.

* * * * *